Patented June 23, 1942

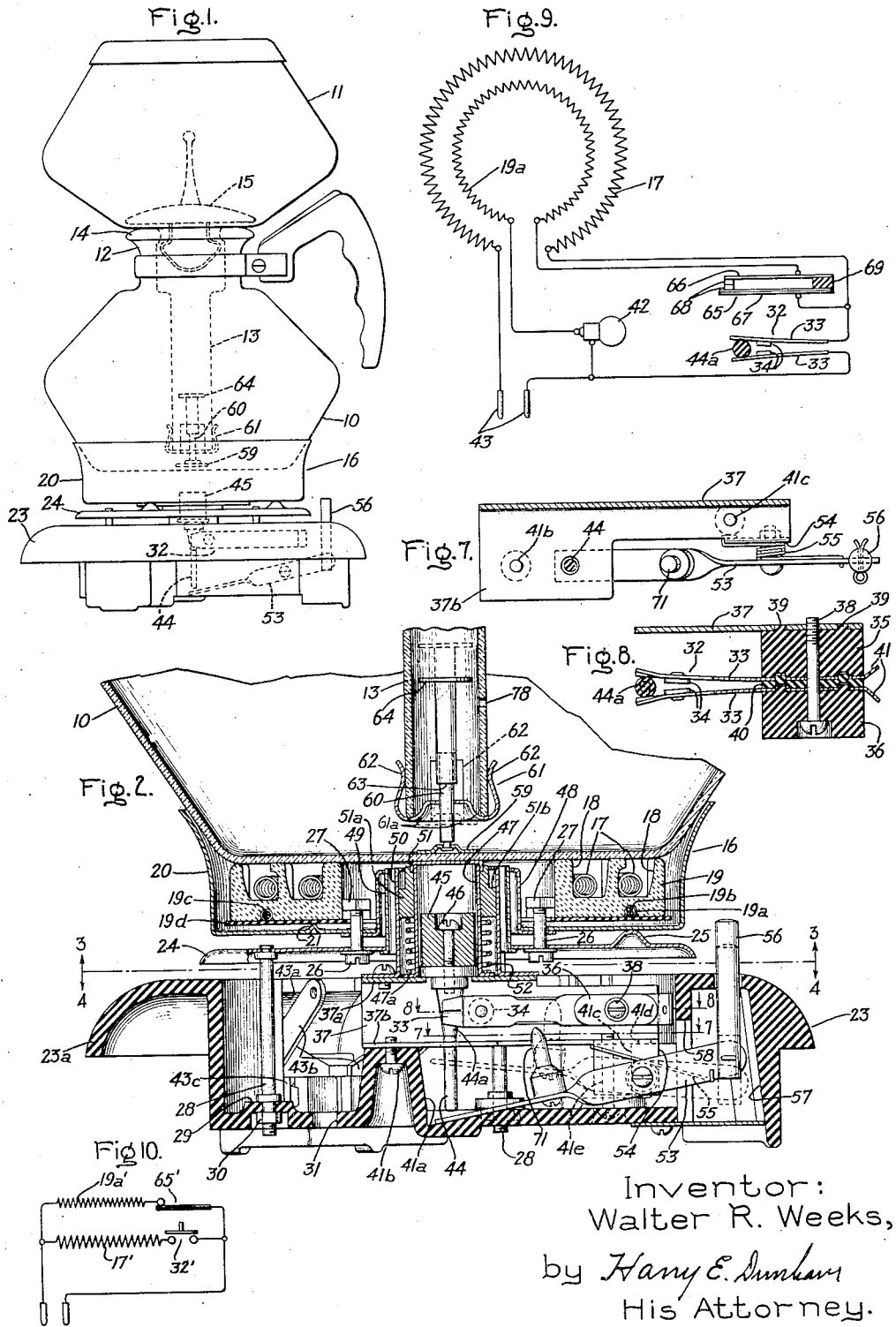

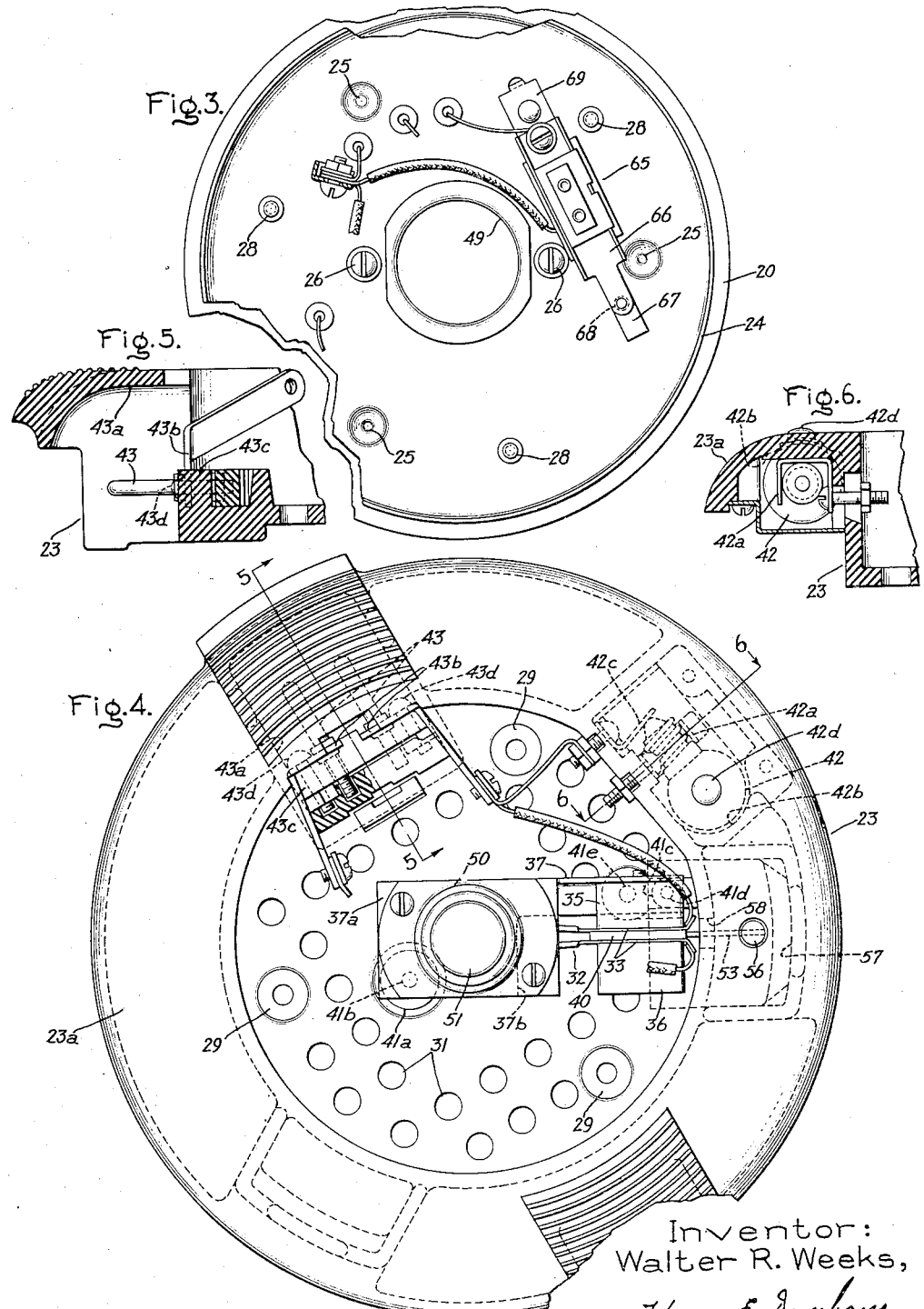

2,287,583

UNITED STATES PATENT OFFICE 2,287,583

COFFEE MAKER

Walter R. Weeks, Hamden, Conn., assignor to General Electric Company, a corporation of New York Application September 18, 1940, Serial No. 357,256

27 Claims. (Cl. 219—43)

This invention relates to coffee makers, more particularly to coffee makers of the vacuum type wherein heated water is transferred from a water heating receptacle to a coffee infusion receptacle where the brew is made and thereafter returned to the water heating receptacle when the heat applied thereto has been reduced sufficiently, and it has for its object the provision of an improved device of this character.

In one of its aspects, this invention contemplates the provision of an improved coffee maker of this character which in a simplified and improved manner automatically reduces the heat applied to the water heating receptacle after the water has been transferred to the infusion receptacle so that the brew is automatically caused to return to the water heating receptacle. It further contemplates an automatic control which causes the brew to be made and then returned to the water heating receptacle at approximately the same temperature, irrespective of the quantity of coffee that is made; in this way, brews are obtained that are uniform as to strength and taste.

The invention further contemplates the provision of means in a vacuum-type coffee maker for preventing the transfer of water from the water heating receptacle to the infusion receptacle when small quantities of brew are made until the small quantity of water being heated attains the proper temperature for making the brew.

In accordance with this invention, the heater for the water heating receptacle is controlled automatically to diminish the heat applied thereto after the water has been transferred responsively to the transfer of the water out of the water heating receptacle. In one form of the invention, a suitable control element is located in the transfer tube and is constructed and arranged so as to be moved in the tube responsively to the fluid flowing in it when the rate of fluid flow attains a predetermined high velocity. This occurs at the end of the transfer period when the water is boiling rather violently. This movement of the control element is utilized to reduce the heat applied to the water heating vessel so as to cause the return of the brew to it.

In one specific form of the invention, a magnet is used to control the heater to reduce the application of heat to the water heating receptacle responsively to this movement of the control element. The magnet when in one position permits the application of heat to the water heating bowl, and when moved to another reduces the heat applied. The magnet is retained in the first position, to permit heat to be applied, by an armature. The armature is moved away from the magnet by the control element when it moves in the tube to thereby release the magnet and permit it to move to the second position to effect the reduction of heat applied.

In order to prevent the transfer of water to the infusion receptacle when small quantities of brew are to be made, the tube is provided with a vent which opens into the water heating receptacle at a level which is apparently the level of the water in the receptacle when the minimum quantity of coffee is being made. In other words, the vent is submerged by the water in the water heating vessel when any quantity of coffee is made above the minimum, and becomes effective only when the water level reaches the level of the vent. The vent prevents the transfer of the water below its level until the entire quantity of water attains the proper temperature.

Preferably, when the coffee has been infused, the heat applied will not be reduced to zero, but to some small value which will hold the temperature of the prepared brew after it returns to the water heating vessel. Means are provided that prevent the application of the temperature maintaining heat until the brewed coffee has returned to the water heating bowl. In one form of this invention, the application of the temperature maintaining heat is delayed until the stove structure has cooled to a predetermined temperature which is below that at which the brew is returned.

For a more complete understanding of this invention, reference should be had to the accompanying drawings in which Fig. 1 is a vertical elevation of a vacuum-type coffee maker embodying this invention; Fig. 2 is a fragmentary sectional view taken through a part of the apparatus shown in Fig. 1 and on a larger scale than Fig. 1; Fig. 3 is a fragmentary sectional view taken through the line 3—3 of Fig. 2 and looking in the direction of the arrows; Fig. 4 is a fragmentary sectional view taken through the line 4—4 of Fig. 2 and looking in the direction of the arrows; Fig. 5 is a fragmentary sectional view taken through the line 5—5 of Fig. 4 and looking in the direction of the arrows; Fig. 6 is a fragmentary sectional view taken through the line 6—6 of Fig. 4 and looking in the direction of the arrows; Fig. 7 is a sectional view taken through the line 7—7 of Fig. 2 and looking in the direction of the arrows; Fig. 8 is a sectional view taken through the line 8—8 of Fig. 2 and looking in the direction of the arrows; Fig. 9 is a diagrammatic representation showing the heating means for the stove of the coffee maker and certain control elements therefor; and Fig. 10 is a diagrammatic representation similar to Fig. 9 but showing the heating means and controls connected in a modified circuit arrangement.

Referring to the drawings, this invention has been shown in one form as applied to a coffee maker of the vacuum type comprising a lower water heating bowl or receptacle 10 and an upper coffee infusion bowl or receptacle 11. The lower bowl 10 is provided at its upper end with an upright neck 12 within which a depending liquid transfer tube 13 provided on the lower end of the upper bowl 11 is received. A suitable gasket 14, preferably formed of rubber, is inserted in the neck 12 of the lower bowl and is provided with a centrally arranged aperture to receive the tubular extension 13 provided on the upper bowl 11. As shown in Fig. 1, the lower end of the tubular member 13 terminates just above the bottom wall of the water heating vessel 10. Seated within the bottom of the coffee infusion vessel 11 over the mouth of the liquid transfer tube 13 is a suitable filter 15. It will be observed that the vertical central axes of the two bowls 10 and 11 and of the tube 13 are substantially coincident.

It will be understood that in the operation of coffee makers of this character water is placed within the water heating bowl 10, while the coffee grounds are placed within the infusion vessel 11 above the filter 15. When the water in the lower bowl 10 is heated a pressure is created above the liquid level and eventually this pressure becomes so great that it forces the water through the transfer tube 13 into the infusion vessel 11. When the heat is removed from the lower bowl, the water vapor therein condenses and the vacuum thereby created is sufficiently great to cause the coffee brew in the upper bowl to pass through the filter 15 into the lower bowl.

The two bowls 10 and 11 are supported by a stove or heater 16 which is arranged to apply heat to the bottom wall of the water heating bowl 10. The stove comprises a helical resistance conductor 17 mounted in channels 18 provided for it in a suitable supporting brick 19. Any suitable supporting brick may be used, but I prefer to use a brick formed of a ceramic having a relatively low coefficient of thermal expansion. Also mounted on the heater brick is a suitable relatively high resistance temperature maintaining unit 19a. This unit 19a may be and as shown is wound on a supporting insulating core 19b made of asbestos fibers or the like. As shown, this core with the element 19a thereon is mounted in a channel 19c provided for it in the lower surface of the brick 19. Covering the bottom surface of the brick 19 is a sheet 19d formed of a suitable electrically insulating material, such as mica. The unit 19a is formed of very high resistance fine wire, and it is placed in the channel under the heating brick and covered by the mica sheet in order to protect it from mechanical injury. The brick 19, together with the resistance conductors 17 and 19a and the sheet 19d, is mounted within a casing 20 having the shape of a shallow pan, and these members are spaced from the bottom wall of the casing by a series of upright protuberances 21 formed in the bottom wall.

It is contemplated that the low resistance element 17 in the top of the brick will be used for quickly heating the water to make the coffee brew, and that this element will be connected in series with the resistance element 19a to generate the temperature maintaining heat to keep the brew hot after it has been made.

The casing 20 is mounted upon a suitable base 23. As shown, the casing 20 is supported somewhat above the base 23, and interposed in the space between the base and the bottom of the casing 20 is a suitable heat-intercepting baffle 24. The baffle 24 is provided with a series of upright protuberances 25 upon which the casing 20 rests, and the casing 20 is secured to the baffle by means of bolts 26 which, as shown, are threaded through apertures provided for them in the baffle, the lower wall of the casing 20, the insulating sheet 19d and the heater brick. Nuts 27 are threaded on the upper ends of the bolts to hold these elements together. The baffle 24 is rigidly secured to the base 23 by means of a plurality of elongated upright supporting columns 28, the lower ends of which are directed through bosses 29 in the bottom wall of the base 23 and which are secured to the base by means of nuts 30 threaded on the lower ends of the columns, as clearly shown in Fig. 2. The upper ends of these columns are riveted to the baffle, as shown.

Preferably, the base 23 will be formed of a suitable phenol condensation product and for this reason it is highly desirable that very little heat be permitted to pass from the heating means in the casing 20 to the base. It will be observed that the casing 20 is spaced above the heat-intercepting baffle which in turn is spaced above the upper edge of the base. This construction prevents the passage of any substantial amount of heat by radiation to the base. Also, it will be observed that before any heat can be conducted to the base it must first flow through the small protuberances 25 between the casing 20 and the baffle, thence laterally through the baffle to the long columns 28 and thence down these long columns to the base. Practically no heat can be conducted through this long path to the base. Moreover, the columns 28 preferably will be made of a material having a relatively poor heat conductivity, such as the nickel-iron alloy "Invar." In addition, the base is provided with a series of apertures 31 which permit cooling air to enter the bottom of the base and circulate upwardly and outwardly through the annular space between the upper edge of the base and the baffle 24.

Preferably, the side walls of the base will be provided with an over-hanging curved skirt-like rim 23a extending outwardly and downwardly from the upper end thereof, as clearly shown in Fig. 2.

The heating resistances 17 and 19a are controlled responsively to the transfer of liquid from the water heating bowl 10 through the tube 13 to the coffee infusion bowl 11 so that after the water has been transferred to the infusion bowl the heat applied to the lower bowl is reduced sufficiently to permit the water vapor therein to condense and thereby cause the return of the coffee brew to the lower bowl. The resistances are controlled directly by means of a switch 32 having a pair of resilient contact arms 33. These arms carry cooperating switch contacts 34 which are connected in the energizing circuit for the heating elements 17 and 19a, and which the switch arms bias together to make contact. As shown in Fig. 8, the switch arms 33 are clamped between electrically insulating blocks 35 and 36 which are secured to a suitable metallic supporting bracket 37 by means of a screw member 38 directed through apertures provided for it in the blocks and threaded into the bracket 37. As shown, the block 35 is provided with protuberances 39 which are received in apertures provided for it in the bracket 37 to prevent the blocks from rotating. Interposed between the two switch contact arms is a suitable sheet 40 formed of any suitable electrically insulating material, such as a suitable laminated phenol condensation material, and as shown, the block 36 is provided with bosses directed through the adjacent arm 33 and received in the member 40, which likewise has bosses directed through the other switch arm and received in the member 35. The switch arms 33 are provided with terminal sections 41 to which the leads connecting the switch in the energizing circuit are secured in any suitable manner, as by soldering.

The bracket 37 is provided with a pair of parallel flanges 37a and 37b on its upper and lower edges. The left hand end of the lower flange 37b, as viewed in Fig. 2, is secured to a suitable upright boss 41a molded on the bottom wall of the base 23, and is secured thereto by means of a screw 41b, as shown. The other end of this flange is mounted upon an upright boss 41c which is provided with a small upright extension 41d received in an aperture provided for it in the lower flange. This end of the lower flange is secured to the bottom wall of the base by means of a long screw 41e directed through a boss in the bottom wall and threaded into the flange 37b.

A suitable signal lamp 42 is provided to give an indication when the coffee brew has been made. As shown, this lamp is connected in series with the temperature maintaining unit 19a. The signal lamp 42 is mounted in a suitable spring contact clip 42a which engages one terminal of the lamp, as shown. This clip is mounted in a pocket 42b formed under the rim of the base 23. A second spring contact 42c also mounted in the pocket 42b engages the other terminal of the lamp, as shown. The two spring contacts are secured to the walls of the pocket by suitable screw fastening devices, as shown in Figs. 4 and 6. The lamp is viewed through a window 42d in the rim of the base.

The heating units 17 and 19a, and signal lamp 42 are supplied electrically through a pair of terminal pins 43, and their energization is controlled by the switch 32. The terminals 43 are mounted in a pocket 43a molded under the rim of the base, as shown in Figs. 4 and 5. Each terminal pin is mounted upon a conducting plate 43b which is secured to a shoulder 43c on the base by means of a bolt 43d. As shown in Fig. 9, when the switch contacts 34 are closed the high wattage unit 17 will be connected to the terminals 43 to provide a high heat, while the unit 19a and lamp 42 will be shorted out of the circuit; and when the contacts are open, the units 17 and 19a will be connected in series to the terminals to provide a low heat. Here also, the signal lamp 42 will be connected in series with the resistances.

The switch blades 33 are controlled by means of a plunger 44 which is vertically positioned in the casing 23, and which is mounted to move vertically in the parallel flanges 37a and 37b of the bracket 37 which have apertures through which the plunger moves, as shown in Fig. 2. The plunger 44 at the top is provided with an enlarged tapered section 44a which when the plunger moves downwardly, as viewed in Fig. 2, engages the switch arms to separate them and open contacts 34, whereas when the plunger is elevated the enlarged section is removed from the switch arms so as to permit them to bring contacts 34 together. Rigidly secured to the upper end of the plunger 44 is a cylindrical permanent magnet 45. As shown, the magnet is secured to the plunger by means of a suitable screw 46. The magnet 45 is mounted for vertical movement in a suitable cylindrical casing 47, the longitudinal axis of which lies substantially in the vertical center line of the base 23, and which projects upwardly through openings provided for it in the baffle 24, the bottom of the casing 20 and also the heater brick, as clearly shown in Fig. 2. The bottom wall of the casing 20 has a reentrant cylindrical section 48 which surrounds the member 47 in spaced relation with it. The baffle 24 also carries and has secured thereto a cylindrical member 49 interposed between the cylindrical members 47 and 48, and inserted in the space between the two members 47 and 49 is another cylindrical member 50 secured to the bracket flange 37a. The members 47, 48, 49 and 50 are in substantially concentric relation. The principal purpose of cylindrical members 48 and 49 is to prevent the flow of heat from the brick 18 to the magnet 45 and its enclosure and thereby prevent possible damage to these elements by heat. The casing 47 at its bottom has an out-turned flange 47a resting upon the upper bracket flange 37a. Mounted above the upper end of the cylindrical member 47 is a cap 51. This cap, as shown, has a depending skirt to which is secured a cylindrical bushing 51a which is received in the annular space between the two members 47 and 50. The cap and bushing are free to move vertically in this space for a limited distance, the downward movement being limited by the engagement of the cap with the upper edge of the cylinder 47 and the upward movement being limited by the engagement of a shoulder 51b on the bushing with the upper edge of the cylinder 50 which is turned in to form a flange-like stop for the cap. Interposed between the flange on the lower end of the cylinder 47 and the under side of the bushing 51a is a suitable compression spring 52 which biases the cap upwardly so that it will in all cases be forced against the bottom wall of the lower bowl 10 when it is placed on the stove.

It will be observed that when the magnet 45 is in its lower position, as shown in Fig. 2, the plunger 44 will be in its position to hold the switch contacts 34 open. The plunger 44 and magnet 45 are elevated to remove the enlarged section 44a and thereby permit the switch contacts to close by means of a manually operable lever 53 which is pivotally mounted upon a flange 54 depending from the lower flange 37b of the bracket 37. This lever is biased to move in a counter-clockwise direction, as viewed in Fig. 2 by means of a spring 55, and is moved in a clockwise direction against the bias of this spring by means of a plunger 56 which is pivotally connected to one end of the lever, as shown in Fig. 2. As shown, the plunger 56 is mounted for vertical movement in a suitable recess or cavity 57 molded in the base 23 under its rim. The end of the lever 53 which is connected with the plunger enters this recess through a suitable opening 58. The end of the lever opposite the plunger 56 is twisted 90 degrees and lies directly under the plunger 44 so that when the plunger 56 is depressed the plunger 44 is elevated to permit the switch contacts to close.

When the plunger 44 is elevated, the magnet 45 is forced upwardly against the cap 51 which, as pointed out previously, is forced directly against the bottom wall of the water heating vessel 10 by the spring 52. The magnet, therefore, is separated from the bottom wall of the vessel 10 only by the thickness of the cap 51. The magnet is held in this upper position against the cap by means of an armature 59 which is adapted to rest upon the inside bottom wall of the bowl 10 directly above the magnet. The armature 59 is secured to the lower end of a pin 60 which in turn is directed through an aperture provided for it in a socket 61. This socket is provided with apertures 61a through which liquid can flow, and also with resilient fingers 62 that are adapted to grip the lower end of the water transfer tube 13, as shown in Fig. 2, so as to secure the socket and pin to the tube. The upper part of the pin is enlarged so as to provide a shoulder 63 intermediate the ends of the pin so that the pin will be kept from dropping too low when the upper bowl has been removed. A suitable actuator 64 is secured to the upper end of the pin 60. In the form of the invention shown in the drawings, the actuator has a disc-like shape, but it is to be understood that it may have other suitable shapes, such as the shape of a pear. The actuator 64, guided by the transfer tube 13 and the lower portion of the pin guided by the socket 61, serves to keep the axis of the pin substantially concentric with the axis of the transfer tube 13. When the upper bowl 10 is removed from the lower bowl 11 the pin 60 drops until shoulder 63 rests on socket 61. In this position the two guide points are still sufficiently removed from each other to continue to maintain the axis of the pin substantially concentric with the axis of the transfer tube 13. This prevents the pin from lying at an angle to the axis of the lower bowl when the upper bowl is assembled into the lower bowl and thus avoids jamming of the pin.

It will be observed that as long as the armature 59 rests upon the bottom wall of the bowl 10, it will be attracted to the magnet 45 so as to hold the magnet in its upper position with the switch blades closed. Preferably, the armature 59 will be made of pure nickel, and it will have such a thickness that it practically saturates magnetically when the magnet is brought upwardly to its position directly below it. This insures uniformity in operation for variations in magnetic field strength within relatively wide limits. Should the armature 59 be elevated, the magnet no longer can attract itself to the armature and it will fall so as to open the switch contacts 34 to thereby reduce the heat applied to the lower bowl.

The armature 59 is automatically elevated to release the magnet responsively to the transfer of the liquid from the lower bowl 10 to the upper infusion bowl 11. This is accomplished by the action of the fluid, flowing through the transfer tube 13, on the actuator 64. When the velocity of the fluid attains a predetermined high value it acts upon the actuator to force it upwardly in the tube to elevate the armature 59 from the bottom wall. This occurs at the end of the transfer period when the water is boiling violently and the fluid stream of combined hot water and steam is rapidly passing up the transfer tube.

When the water has been transferred to the coffee infusion bowl 11 and the magnet dropped to open the switch 32, it is desirable to prevent the energization of the temperature maintaining circuit, previously described, until the coffee brew has returned to the lower bowl 10. If the temperature maintaining circuit be energized immediately upon the transfer of the water to the infusion vessel 11, the application of the heat will delay the return of the brew to the lower bowl. In order to prevent this delay, a suitable thermostatic switch device 65 is connected in series with the resistance heating element 19a, as shown in Fig. 9. Preferably, a thermostatically-operated switch of the bimetallic type will be used. This switch comprises a switch arm 66 (Fig. 3), and a suitable bimetallic element 67 mounted in substantially parallel relation with the switch arm. These members carry cooperating contacts 68 which are connected in the circuit as shown in Fig. 9 so that when they are closed and the switch 32 is open, the heating elements 17 and 19a, and the lamp 42 all will be connected in series and a temperature maintaining heat will be provided, whereas, when the contacts 68 are open, this circuit will be denergized. In the operation of the device, it will be understood that when the stove is heated up during the water heating step the bimetallic blade 67 will be heated to open the contacts 68, and that thereafter when the coffee brew has been made and the switch 32 opened, the thermostat will not reclose the contacts to establish the temperature maintaining circuit until the stove has cooled down sufficiently to cause the transfer of the prepared brew to the lower bowl 10. The bimetallic blade 67 and the switch arm 66 are mounted upon a suitable bracket 69 that is secured to the bottom of the baffle 24. These members are electrically insulated from the bracket by any suitable means, such as by sheets of electrically insulating material.

If desired, the heating elements 17 and 19a and their controlling elements 32 and 65 may be connected as shown in Fig. 10, rather than as shown in Fig. 9. Here the various elements of Fig. 9 are designated by the same numerals as in Fig. 9 but they are primed. In Fig. 10, when the terminals are first energized the switch 32' and the thermostat 65' will be energized; this will connect the two elements 17' and 19a' so that the output of both elements will be supplied. Eventually the thermostat will open and thereby disconnect the element 19a so that only the element 17' will be supplying heat; this will occur either before or while the water is being transferred to the upper bowl. When all of the water is transferred and the switch 32' opened, no heat will be supplied. Subsequently when the thermostat 65' has cooled sufficiently it will close and energize the unit 19a' so as to maintain the temperature of the prepared coffee brew.

Rigidly secured to the upper side of the lever 53, as viewed in Fig. 2, is a pin 71 which when the manually operable plunger 56 is depressed moves upwardly between the switch arms 33 to temporarily hold them open until the magnet 45 has been secured in its upper position by its armature 59 and until the lever 53 is moved back to its original position by its spring 55. This prevents any one from holding the plunger 56 down in its lower position and operating the stove as a hot plate for miscellaneous purposes. If it were not for this construction, it is clear that it would be possible to hold the plunger 56 down permanently by any suitable means, as by a weight or adhesive tape, and operate the stove for the purpose of miscellaneous cooking operations. In addition, if the pin 71 were omitted it is possible that when the coffee bowls are seated upon the stove but without the armature 59 in place, one might depress and release the plunger 56 very slowly in which case it is possible that the switch arms 33 might retain the magnet 45 in a partial elevated position with contacts 34 touching each other. In other words, the magnet would not have sufficient inertia at this time to carry the large plunger section 44a down between the switch arms 33 to open the contacts 34. This, of course, would leave the stove energized and unless the terminals 43 were deenergized, the glassware would become so hot as to be destroyed, and the stove so hot as to be damaged. The pin 71 obviates this difficulty because it spreads the switch arms 33 sufficiently far apart to permit the enlarged section 44a to move downwardly sufficiently far to keep the switch arms and thus contacts 34 apart when the pin 71 is withdrawn.

In order to insure that the water is heated to the proper infusing temperature when small quantities of coffee are being made as well as when large quantities are made, I provide in the liquid transfer tube 13 a small vent 78 opening into the bowl 10 at a point approximately at the level of the water which is supplied to the lower bowl for making the minimum quantity of coffee for which the particular coffee maker is designed. In the specific form of the invention illustrated in the drawings, this minimum is two cups. In the absence of the vent when small quantities of coffee are made the relatively large volume of air above the water level in the bowl 10 becomes heated as heat is applied to the lower bowl, and as a result it expands and transfers the water to the infusion vessel 11 long before the water has been heated to the proper brewing temperature. For example, it has been found that without the vent in making two cups, the water might be transferred at a temperature as low as 135° F. This, of course, is far below the desired brewing temperature which should be around 190° to 200° F. However, when the vent hole is located at this level of the liquid, the air above the liquid level is permitted to escape through the vent hole and up through the tube and out through the infusion vessel 11. Only when the water has been heated to the boiling point and there is such a rapid generation of steam in the bowl 10 that it cannot all escape through the opening 78 is there sufficient pressure generated to transfer the water to the upper bowl.

The vent 78 also functions to compensate for premature infusion when larger quantities of coffee are made, the compensating effect decreasing as the quantity increases. It will be understood that the greater the quantity of water placed in the lower bowl 10, the smaller is the volume of the remaining air space above the liquid level, and therefore, there is less tendency for the water to be forced into the upper bowl by air expansion. However, such a tendency does exist where quantities less than the maximum are made, the tendency becoming greater as the quantity diminishes. But in each case only water above the vent opening 78 can be transferred by the expansion of the air above the liquid level, the remaining small quantity of water in the bowl 10 not being transferred until it has been heated to the boiling point; and the water which has already been transferred is heated to a higher temperature by the steam generated in boiling the residual water in the lower bowl so that irrespective of how much coffee is being made the water in each case is heated substantially to the same brewing temperature before the heat is reduced to cause it to return to the lower bowl.

In addition, I prefer to cause the vent 78 to function to insure the proper operation of the actuator 64 upwardly in the transfer tube to effect the reduction in the heat applied to the lower bowl. For this purpose, the actuator 64 will be located just above the vent opening 78. As previously pointed out, the vent opening always keeps a residual quantity of water in the bowl 10 until it is boiling violently and thereby insures a high velocity fluid stream at the end of the transfer period, up through the transfer tube and into contact with the actuator; and moreover, the vent admits a second stream of fluid to the transfer tube directly under the actuator in addition to the stream flowing directly up the tube from the bottom. Here it is to be noted that the shoulder 63 on the pin 60 functions to keep the member 64 at all times above the vent hole 78 so that fluid passing through the vent will act on the member 64.

In the operation of the coffee maker, it will be understood that when the water has been placed in the bowl 10 and the coffee grounds in the bowl 11, the plunger 56 is depressed which operation elevates the magnet 45 to its upper position where it is kept by the armature 59. When the plunger 56 is released, the spring 55 returns it to its original position and permits the switch contacts 34 to close. This energizes the resistance element 17 and applies high heat to the bowl 10. When the water has been heated sufficiently, it is transferred through the tube 13 to the upper infusion vessel 11 and at the end of the transfer period the rapidly moving stream of fluid out of the vessel 10 elevates the member 64 and removes the armature 59 from the magnet 45. This permits the magnet to fall and thereby automatically open the switch contacts 34. In the meantime, due to the fact that the stove has become heated to a relatively high temperature, the thermostat 65 will have moved to its open position. Therefore, even though the contacts 34 are opened at the end of the transfer period, the temperature maintaining circuit cannot be energized until the stove has cooled down sufficiently to first cause the coffee brew to return to the water heating vessel. Only after this has happened does the thermostat 65 cool sufficiently to close the contacts 68. When these contacts are closed, the temperature maintaining circuit wherein the resistances 17 and 19a are connected in series is automatically energized to keep the brew warm. The heater will function to keep the brew warm until the terminals 43 are deenergized. At the same time the temperature maintaining circuit is established, the lamp 42 is energized to indicate that the brew is made and is being kept warm.

It will be understood that after the final rush of the fluid through the tube 13 has elevated the member 64 and the armature 59 that these members will return to their lower positions.

At this time, of course, they can have no controlling function because in the meantime the magnet 45 will have dropped to its lower position.

It is to be understood that while the water heating bowl of specific coffee maker illustrated in the drawings has been heated by an electric stove, it may be heated by a gas stove (not shown). In this case, the magnet 46 when closed at the end of the transfer period would operate a suitable valve to reduce the heat applied to the lower bowl from a high heat to a low temperature-maintaining heat.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

What I claim as new and desire to secure by Letters Patent of the United States is:

1. A coffee maker comprising a water heating bowl, a water transfer tube leading from said bowl, a heater for heating the water in said bowl to cause it to flow out of said bowl through said transfer tube, and means operated responsively to the flow of the water in said tube controlling said heater to reduce the heat applied to said bowl when the water has been substantially transferred from said bowl.

2. A vacuum-type coffee maker comprising a water heating bowl, a water transfer tube leading from said bowl, a heater for applying heat to said bowl to cause the water to flow out of said bowl through said transfer tube, and a control device for said heater within said bowl actuated responsively to the flow of the water in said tube as it is transferred from said bowl so as to reduce the heat applied to said bowl when said water has been substantially transferred from said bowl.

3. A coffee maker comprising a water heating bowl, a heater for applying heat to said bowl, a water transfer tube in said bowl for transferring the water from said bowl when it is heated, a control device for said heater within the tube movable from one controlling position to a second controlling position by the force of the fluid flowing in said tube, and means operated by the movement of said control device to said second controlling position for shutting off the heat from said bowl.

4. In a vacuum-type coffee maker having a water heating bowl, a coffee infusion bowl and a water transfer tube between them having one end terminating at a point adjacent the lower wall of the water heating bowl, a heater for heating said water heating bowl, a control device constructed and arranged to be applied to said one end having an operating member in said tube operable to a controlling position by a flow of fluid in said tube at a predetermined rate, and means operated responsively to the movement of said member controlling said heating means to reduce the heat applied to said water heating bowl.

5. In a vacuum-type coffee maker having a water heating bowl, a coffee infusion bowl and a water transfer tube between them having one end terminating at a point adjacent the lower wall of said water heating bowl, a heater under said water heating bowl for applying heat to the liquid in said bowl, a control device for said heater, a magnet and an armature controlling the operation of said control device, one of said members constructed and arranged to rest on said bottom wall, and the other under said wall at a point opposite the one on said wall and operably associated with said control device to effect the operation thereof to cause said heater to apply heat to said water heating bowl when said members are attracted toward each other and to reduce the heat applied to said bowl when they are separated, and an actuator connected to said one member constructed and arranged to move in said tube by the force of the fluid flowing therein so as to move said one member to separate said members when the rate of flow of said fluid attains a predetermined velocity.

6. In a vacuum-type coffee maker having a water heating bowl, a coffee infusion bowl and a transfer tube between them having one end terminating at a point adjacent the lower wall of the water heating bowl, a heater under said water heating bowl for applying heat to the liquid in said bowl, a control device for controlling the operation of said heater, a magnet and an armature controlling the operation of said control device, one of said members constructed and arranged to rest on said bottom wall, and the other under said wall at a point opposite the one on said wall and operably associated with said control device to effect the operation thereof to cause said heater to apply heat to said water heating bowl when said members are attracted toward each other and to reduce the heat applied to said bowl when they are separated, an actuator connected to said one member constructed and arranged to move in said tube by the force of the fluid flowing therein so as to move said one member to separate said members when the rate of flow of said fluid attains a predetermined velocity, and a member attached to said one member and said actuator constructed and arranged to be attached to said end of said tube so as to secure said one member and actuator to said tube.

7. In a vacuum-type coffee maker having a water heating bowl, a coffee infusion bowl and a water transfer tube between them having one end terminating at a point adjacent the lower wall of the water heating bowl, a heater under said water heating bowl, a resilient socket constructed and arranged to be fitted to said one end of said tube over said lower wall, a pin supported by said socket so as to project from said end of said tube, an armature on the outer end of said pin positioned so as to rest on said lower wall, an actuator within said tube attached to the other end of said pin constructed and arranged to be moved away from said lower wall to carry the armature away from said wall by the action of the fluid flowing in said tube out of said water heating bowl, a magnet constructed and arranged to be placed under said lower wall so as to be held in an upper position by said armature, and means operated responsively to the falling of said magnet when released by said armature, controlling said heater to reduce the amount of heat supplied to said lower wall.

8. In a vacuum-type coffee maker having a water heating bowl, a coffee infusion bowl and a water transfer tube between them having one end terminating at a point adjacent the lower wall of the water heating bowl, a heater under said water heating bowl, a resilient socket constructed and arranged to be fitted to said one end of said tube over said lower wall, a pin supported by said socket so as to project from said end of said tube, an armature on the outer end of said pin positioned so as to rest on said lower wall, an actuator within said tube attached to the other end of said pin constructed and arranged to be moved away from said lower wall to carry the armature away from said wall by the action of the fluid flowing in said tube out of said water heating bowl, a magnet constructed and arranged to be placed under said lower wall so as to be held in an upper position by said armature, means operated responsively to the falling of said magnet when released by said armature controlling said heater to reduce the amount of heat supplied to said lower wall, and a manually operable member for moving said magnet to its upper position.

9. In a vacuum-type coffee maker having a water heating bowl, a coffee infusion bowl and a liquid transfer tube between the bowls, a stove for heating said water heating bowl, a magnet on said stove controlling the operation thereof so that when said magnet is moved from a first to a second position said stove reduces the heat applied to said bowl, and said magnet biased to move to said second position, an armature for holding said magnet in said first position, and means moving said armature to release said magnet to permit it to move to said second position responsively to the flow of liquid in said tube as it is transferred from said water heating bowl.

10. In a vacuum-type coffee maker having a water heating bowl, a coffee infusion bowl and a liquid transfer tube between the bowls, a heater for supporting and applying heat to said water heating bowl, a vertically movable housing on said heater under said water heating bowl, a spring biasing said housing upwardly so that its top wall will contact the bottom wall of said water heating bowl when the bowl is placed on said heater, a magnet mounted for vertical movement within said housing, a manually operable member for moving said magnet upwardly against said top wall of said housing, an armature adjacent said top wall of said housing for holding said magnet against said top wall, means for moving said armature away from said top wall responsively to the flow of liquid in said tube from said water heating bowl to release said magnet and thereby permit it to fall, and means operated by said magnet as it falls controlling said heater to reduce the heat applied to said water heating bowl.

11. In a vacuum-type coffee maker having a first bowl for heating water, a second bowl for infusing the coffee and a liquid transfer tube between the two bowls, an electric stove for supporting and heating said first bowl comprising a resistance element, a switch controlling said resistance element having a pair of contacts, supporting arms for said contacts biasing them together so as to energize said resistance element, a plunger constructed and arranged to separate said contacts when moved between said supporting arms so as to deenergize said resistance element, a magnet attached to said plunger biasing the plunger between said supporting arms to separate said contacts, an armature for holding said magnet in position to keep said plunger away from said supporting arms to permit said contacts to close, means responsive to the transfer of water from said first bowl for removing said armature from said magnet to release the magnet and thereby permit it to move the plunger between said supporting arms to open said contacts, and a manually operable member for moving said plunger from its position between said supporting arms.

12. In a vacuum-type coffee maker having a first bowl for heating water, a second bowl for infusing the coffee and a liquid transfer tube between the two bowls, an electric hot plate for supporting and heating said first bowl comprising a resistance element, a switch controlling said resistance element having a pair of contacts, supporting arms for said contacts biasing them together so as to energize said resistance element, a plunger constructed and arranged to separate said contacts when moved between said supporting arms so as to deenergize said resistance element, a magnet attached to said plunger biasing the plunger between said supporting arms to separate said contacts, an armature for holding said magnet in position to keep said plunger away from said supporting arms to permit said contacts to close, means responsive to the transfer of water from said first bowl for removing said armature from said magnet to release the magnet and thereby permit it to move the plunger between said supporting arms to open said contacts, a manually operable lever mounted for movement from a first to a second position constructed and arranged when so moved for operating said plunger away from said arms, means operated by said lever for holding said contacts open while moving said plunger away from said arms, and means biasing said lever to move to said first position.

13. A vacuum-type coffee maker comprising a first bowl for heating water, a second bowl for infusing coffee, a liquid transfer tube between said bowls, a heater for applying heat at a high rate to said first bowl, and means controlling said heater operable responsively to the flow of liquid in said transfer tube for shutting off the high rate heat generation and rendering said heater effective to apply heat to said first bowl at a low warming rate.

14. A vacuum-type coffee maker comprising a first bowl for heating water, a second bowl for infusing coffee, a liquid transfer tube between said bowls, heating means for applying heat to said first bowl, control means for said heating means for causing it to apply heat to said first bowl at a high rate to heat the water therein so as to cause it to flow through said tube to said second bowl and operable responsively to the flow of water in said transfer tube for shutting off the heat to said first bowl when said water has been substantially transferred to said second bowl, and an auxiliary control means for said heating means operable responsively to the temperature thereof so as to control the heating means to apply a temperature maintaining heat to said first bowl when said heating means has cooled to a predetermined low temperature.

15. A vacuum-type coffee maker comprising a first bowl for heating water, a second bowl for infusing coffee, a liquid transfer tube between said bowls, an electric heater for applying heat to said first bowl having a high wattage element and a low wattage element, a switch controlling said elements so that when it is in one position said high wattage element only is energized and when in another position said two elements are connected in series, control means for said switch operable responsively to the flow of water from said first to said second bowl through said tube operating said switch to said second position, when said water has been substantially transferred to said second bowl, and a thermostat positioned to respond to the temperature of said heater controlling said heating elements to prevent their energization when said switch is in said second position until said temperature attains a predetermined low value.

16. A coffee maker comprising a water heating receptacle, an infusion receptacle, and a liquid transfer tube connecting said receptacles extending downwardly into said water heating receptacle, said tube having an aperture therein adjacent the lower end thereof approximately at the level of the water that is supplied to said water heating receptacle for making the minimum quantity of coffee in said coffee maker.

17. A coffee maker comprising a water heating receptacle, an infusion receptacle, and a liquid transfer tube connected to said infusion receptacle and extending downwardly into said water heating receptacle, said tube having a vent therein adjacent its lower end opening into said water heating receptacle so that the transfer of liquid from said water heating receptacle to said infusion receptacle is temporarily stopped at the level of said vent to thereby insure a boiling of the residual quantity of water in said water heating receptacle before it is transferred to said infusion receptacle.

18. A coffee maker comprising a water heating receptacle, an infusion receptacle, and a liquid transfer tube connected to said infusion receptacle and extending downwardly into said water heating receptacle, a heater for applying heat to said water heating receptacle, means operated responsively to the rate of flow of fluid in said transfer tube controlling the operation of said heater, and a vent in said transfer tube adjacent its lower end opening into said water heating receptacle.

19. A coffee maker comprising a water heating receptacle, an infusion receptacle, and a liquid transfer tube connected to said infusion receptacle and extending downwardly into said water heating receptacle, a heater for applying heat to said water heating receptacle, an actuator in said tube constructed and arranged to be moved upwardly by the fluid flowing in said tube when said fluid attains a predetermined velocity, means operated responsively to the upward movement of said actuator for reducing the heat applied to said water heating receptacle, and a vent in said tube opening into said water heating receptacle below the level of said actuator.

20. A coffee maker comprising a water heating vessel having an opening in its upper end, an infusion vessel seated in said opening having a liquid transfer tube extending downwardly into said water heating vessel and opening into said vessel at a point adjacent its bottom wall, a hot plate supporting said water heating vessel in position to be heated by the heat generated by said plate, an element controlling the operation of said hot plate, a vertically movable magnet in said plate located under the opening of said tube controlling said element to reduce the heat applied to said water heating vessel when it drops from an upper position, an armature in said water heating vessel directly below said tube opening and above said magnet for holding said magnet in said upper position, and a disc in said tube connected to said armature constructed and arranged to elevate said armature when the rate of fluid flow in said tube attains a predetermined high velocity.

21. In a coffee maker of the vacuum-type having water heating and coffee infusion bowls and a liquid transfer tube between them, a hot plate for heating said water heating bowl, a magnetically operated switch controlling said hot plate, and means operated responsively to the flow of water in said tube from said water heating bowl to said coffee infusion bowl controlling the operation of said switch so as to reduce the heat applied to said water heating bowl when the water has been substantially transferred to said coffee infusion bowl.

22. In a coffee maker of the vacuum-type having water heating and coffee infusion bowls and a liquid transfer tube between said bowls, a hot plate for heating said water heating bowl, comprising an open top base, a bracket inserted in said base, means securing said bracket to the bottom wall of said base, a switch on said bracket, a magnet supported by said bracket for movement from a first to a second controlling position and biased to move to the second position, means on said bracket operated by said movement of said magnet for operating said switch to reduce the generation of heat in said plate, means mounted on said bracket for moving said magnet to said first position, an armature for holding said magnet in said first position, and means operated responsively to the flow of liquid in said tube from said water heating bowl to said coffee infusion bowl for releasing said magnet to permit it to move to said second position.

23. In a coffee maker of the vacuum-type having water heating and coffee infusion bowls and a liquid transfer tube connecting said bowls together, a hot plate for heating said water heating bowl, a magnetized weighted member operable between a first and second position and biased by its weight to the second, means operated by the movement of said member to the second position to reduce the application of heat by said hot plate, an armature for holding said weighted member in said first position, and means controlling said armature for releasing said weighted member responsively to the flow of liquid in said tube from said water heating bowl to said coffee infusion bowl.

24. In a vacuum-type coffee maker having a first bowl for heating water, a second bowl for infusing the coffee and a liquid transfer tube between the two bowls, an electric stove for supporting and heating said first bowl, a control element for controlling the heating effect of said stove, a magnet constructed and arranged when moved to a first controlling position to operate said control element to reduce the heat applied to said first bowl and when moved to a second controlling position to operate said control element to increase the heat applied to said first bowl, a manually operable member movable from a first to a second position for moving said magnet from its first to its second controlling position, means biasing said manually operable member to return to its first position automatically when it is released, an armature for holding said magnet in said first controlling position, means responsive to the transfer of water from said first bowl to said second bowl for separating said armature from said magnet to release the magnet and thereby permit it to move to said first controlling position, and means operated by said manually operable member for controlling said element to prevent the operation of said heater to increase the heat applied to said first bowl until said manually operable member has been released and returned substantially to its first position.

25. In a vacuum-type coffee maker having a water heating bowl, a coffee infusion bowl and a liquid transfer tube between said bowls, a stove for heating said water heating bowl, an armature, a magnet mounted to be moved into attractive relation with said armature, means controlled by the movement of said members together for causing said heater to apply heat to said water heating bowl, and for reducing the heat applied to said bowl when said members are moved apart out of attractive relation, and means for moving one of said members out of attractive relation to the other responsively to the flow of water in said tube as it is transferred from said water heating bowl so as to reduce the heat applied to said bowl when the water has been substantially transferred therefrom.

26. A coffee maker comprising an upper water heating bowl, a lower coffee infusion bowl, a liquid transfer tube connecting said bowls having its lower end terminating at a point above the bottom wall of said water heating bowl, an armature on said bottom wall, an actuator for said armature mounted in said tube and constructed and arranged to move upwardly in said tube responsively to the flow of water upwardly therein, a magnet under said bottom wall held in an upper position by the attractive force between said armature and magnet, and falling to a lower position when said armature is raised, and a control element for said coffee maker operated by said magnet as it falls.

27. A coffee maker comprising a water heating receptacle, an infusion receptacle, and a liquid transfer tube connecting said receptacles extending downwardly into said water heating receptacle, said tube having an aperture therein intermediate its ends opening into said water heating receptacle so that the transfer of liquid from said water heating receptacle to said infusion receptacle is temporarily stopped at the level of said opening to thereby insure the boiling of the residual quantity of water in said water heating receptacle before it is transferred to said infusion receptacle.

WALTER R. WEEKS.